(12) United States Patent
Rundo et al.

(10) Patent No.: US 9,183,644 B2
(45) Date of Patent: Nov. 10, 2015

(54) METHODS AND SYSTEMS FOR THE TREATMENT OF STEREOSCOPIC IMAGES, CORRESPONDING COMPUTER PROGRAM PRODUCTS, AND STORAGE CARRIER

(71) Applicant: STMicroelectronics S.r.l., Agrate Brianza (IT)

(72) Inventors: Francesco Rundo, Gravina di Catania (IT); Giuseppe Digiore, Riposto (IT); Alessandro Ortis, Pedara (IT); Sebastiano Battiato, Aci Catena (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 168 days.

(21) Appl. No.: 13/949,387

(22) Filed: Jul. 24, 2013

(65) Prior Publication Data
US 2014/0029860 A1    Jan. 30, 2014

(30) Foreign Application Priority Data

Jul. 24, 2012   (IT) .............................. TO2012A0647

(51) Int. Cl.
*G06T 9/00*       (2006.01)
*H04N 19/44*      (2014.01)
*H04N 13/00*      (2006.01)
*H04N 19/597*     (2014.01)
*H04N 19/46*      (2014.01)
*H04N 19/30*      (2014.01)
*H04N 19/60*      (2014.01)

(52) U.S. Cl.
CPC .............. *G06T 9/00* (2013.01); *H04N 13/0018* (2013.01); *H04N 13/0029* (2013.01); *H04N 13/0048* (2013.01); *H04N 19/30* (2014.11); *H04N 19/44* (2014.11); *H04N 19/46* (2014.11); *H04N 19/597* (2014.11); *H04N 19/60* (2014.11)

(58) Field of Classification Search
CPC ........... G06T 9/00; H04N 19/00; H04N 19/44
USPC .................................... 382/232, 233; 708/203
See application file for complete search history.

(56) References Cited

U.S. PATENT DOCUMENTS 5,812,071 A * 9/1998 Kairouz ........................... 341/51
6,215,825 B1 * 4/2001 Melen ....................... 375/240.26

(Continued)

OTHER PUBLICATIONS

Amerijckx et al. ("Image compression by self-organized kohonen map," IEEE Transactions on Neural Networks, vol. 9, No. 3, May 1998).*

(Continued)

*Primary Examiner* — Yubin Hung
(74) *Attorney, Agent, or Firm* — Allen, Dyer, Doppelt, Milbrath & Gilchrist, P.A.

(57) ABSTRACT

In an embodiment, a first individual image and a second individual image constituting an encoded stereoscopic image, for example in JPEG format with respective levels of encoding quality and united in a multiple-image file, for example of the Multiple-Picture Object (MPO) type. The second level of encoding quality is lower than the first level of encoding quality. During decoding, the first individual image encoded with a first level of encoding quality and the second individual image encoded with a second level of encoding quality lower than the first level of encoding quality are extracted from the multiple-image file, then using information of the first extracted individual image for enhancing the second extracted individual image.

25 Claims, 3 Drawing Sheets

(56) References Cited

U.S. PATENT DOCUMENTS

| | | | |
|---|---|---|---|
| 6,370,192 B1* | 4/2002 | Pearlstein et al. | 375/240 |
| 2005/0066075 A1* | 3/2005 | Kecman et al. | 710/31 |
| 2009/0010323 A1* | 1/2009 | Su et al. | 375/240.01 |
| 2011/0246545 A1 | 10/2011 | Morimoto | |
| 2011/0279654 A1 | 11/2011 | Ueda et al. | |
| 2012/0224027 A1* | 9/2012 | Takada | 348/46 |
| 2015/0062295 A1* | 3/2015 | Yoneda et al. | 348/43 |

OTHER PUBLICATIONS

Aflaki et al. ("Study of asymmetric quality between coded views in depth-enhanced multiview video coding," International Conference on 3S Imaging, Dec. 7-8, 2011 ).*

Lucas et al. ("Stereo image coding using dynamic template-matching prediction," International Conference on Computer as a Tool (EUROCON), Dec. 27-29, 2011).*

Chen et al. ("Joint reconstruction of compressed multi-view images," IEEE International Conference on Acoustics, Speech and Signal Processing, Apr. 19-24, 2009).*

Search Report for Italian Patent application No. TO2012A000647, The Hague, Holland, Mar. 26, 2013, 2 pages.

Markus B. Schenkel, Chong Luo, Pascal Frossard, and Feng Wu, "Joint Decoding of Stereo JPEG Image Pairs", Proceedings of 2010 IEEE 17th International Conference on Image Processing; Sep. 26-29, 2010, Hong Kong; 4 pages.

Won-Ho Kim, Sung-Woong Ra, "Fast disparity estimation using geometric properties and selective sample decimation for stereoscopic image coding", IEEE Transactions on Consumer Electronics, vol. 45, Issue 1, published 1999, pp. 203-209.

Strintzis, M.G. ; Malassiotis, S., "Object-based coding of stereoscopic and 3D image sequences", IEEE Signal Processing Magazine, vol. 16, n. 3, published 1999, pp. 14-28.

Zhongjie Zhu, Jiang Gangyi, Yu Mei, Xunwei Wu, "Fast disparity estimation algorithm for stereoscopic image sequence coding", Proceedings of TENCON '02. 2002 IEEE Region, 10 Conference on Computers, Communications, Control and Power Engineering, vol. 1, pp. 285-288.

Mi-Hyun Kim, Kwang-Hoon Sohn, "Edge-preserving directional regularization technique for disparity estimation of stereoscopic images", IEEE Transactions on Consumer Electronics, vol. 45, n. 3, Aug. 1999; pp. 804-811.

Boulgouris, N.V., Strintzis, M.G., "Embedded coding of stereo images", Proceedings of 2000 International Conference on Image Processing, 2000, vol. 3, pp. 640-643.

Bensalma, R., Larabi, M.-C., "Optimizing the disparity map by the integration of HVS binocular properties for efficient coding of stereoscopic images", 3DTV-Conference: The True Vision—Capture, Transmission and Display of 3D Video (3DTV-CON), 2010, pp. 1-4.

Coltekin, A., "Space variant image coding for stereoscopic media", Picture Coding Symposium, 2009, PCS 2009, pp. 1-4.

Kohonen, T., Oja, E., Simula, O., Visa, A., "Kangas, J.Engineering applications of the self-organizing map", Engineering applications of the self-organizing map, Proceedings of the IEEE, vol. 84, Issue 10, 1996, pp. 1358-1384.

Nasrabadi, N.M., Feng, Y., "Vector quantization of images based upon the Kohonen self-organizing feature maps", IEEE Proceedings of International Conference on Neural Networks, 1988, vol. 1, pp. 101-108.

Ritter, H., Schulten, K., "Kohonen's self-organizing maps: exploring their computational capabilities", IEEE Proceedings of International Conference on Neural Networks, 1988, pp. 109-116.

Kohonen T.: "The self-organizing map", Proceedings of the IEEE, vol. 78, Issue 9, 1990, pp. 1464-1480.

J. P. Lewis, "Fast Normalized Cross-Correlation", Industrial Light & Magic, 1995, 7 pages.

www.3dmedia.com/gallery; Various verifications have been carried out such as to embrace MPO files as available on-line at this URL; 3D Photo Gallery (MPO or JPS files), 2 pages.

* cited by examiner

METHODS AND SYSTEMS FOR THE TREATMENT OF STEREOSCOPIC IMAGES, CORRESPONDING COMPUTER PROGRAM PRODUCTS, AND STORAGE CARRIER

PRIORITY CLAIM

The instant application claims priority to Italian Patent Application No. TO2012A000647, filed Jul. 24, 2012, which application is incorporated herein by reference in its entirety.

TECHNICAL FIELD

An embodiment relates to processing of stereoscopic images.

Various embodiments may refer to processing of stereoscopic images in a context of the MPO (multiple-picture object) format.

Various embodiments may refer to processing of images for applications in the entertainment sector.

SUMMARY

Stereoscopy is a technique of representation and projection of images (e.g., of films) that simulates the binocular vision of the human visual apparatus for inducing in the brain of the observer the perception of three-dimensionality.

Binocular vision, in fact, is what enables our eyes to perceive the depth of the images and hence reality in three dimensions.

Human eyes are positioned at a distance (referred to as interpupillary distance) from one another of between about 6 and 7 centimeters (cm); binocular vision is based upon the fact that the eyes see the same scene from two different positions, the brain "merges" these two images and generates depth of vision.

By comparing the two images, the brain of the observer is able to perceive how far away an object is from him/her: the greater the offset of an object in the two images, the closer or the further away it is perceived. In fact, in stereoscopic projection, the perception of depth derives from the different visions that we have between the left eye and the right eye.

Human vision uses different cues for determining the relative depth in a scene observed.

Some of these cues are:
  stereopsis;
  adaptation of the ocular bulb (focus of the ocular bulb);
  occlusion of one object by another;
  angle of vision subtended by an object of known dimensions;
  linear perspective (convergence of parallel edges);
  vertical position (objects higher up in the scene generally tend to be perceived as more distant);
  haziness, de-saturation, and bluishness;
  variation in dimension of detail of a textured configuration.

Stereoscopy exploits valorisation of the illusion of depth in a photograph, a film, or other two-dimensional images by presenting a slightly different image for each eye, then adding thereto the first of these cues (stereopsis).

Various display systems use this technique, which was invented by Sir Charles Wheatstone in 1838, to give a perspective to images.

In various techniques, the stereoscopic images are obtained by making two "shots", left and right, with a device having two lenses set at a distance equal to the mean interpupillary distance or with two devices set a distance apart.

The two images are projected in such a way that the image captured with the left lens of the device is seen only by the left eye and the one captured with the right lens of the device is seen only by the right eye. In the simplest configuration, two polarized filters (polarized eye glasses) are applied. These filters modify the polarization of light so that each eye will see exclusively the shot captured by the corresponding device. The brain of the viewer will thus have the illusion that the image is positioned in the point of convergence of the two images.

Stereoscopy finds application in many fields. Photography is the oldest application of stereoscopy, starting from photographic printing to digital images. More recently, stereoscopy has been applied by the multimedia industry in videogames and in mobile telephony. In addition to the entertainment field, stereoscopy has found application in the scientific field. Stereoscopy is applied in astronomic observations through the use of two telescopes at an appropriate distance apart pointed at one and the same object. For example, this has been done in unmanned space exploration, where this technique can be used to enable three-dimensional vision of the places visited. According to the same principles, stereoscopy is applied to microscopic observation and in systems of obstacle recognition that equip certain motor vehicles.

Over the last few years, the performance and potential of digital cameras have been considerably improved, and this offers the possibility of detecting and recording not only data on individual images, but also data on multiple images that are correlated for displaying, for example, on a monitor, as image data with a specified number of pixels.

This possible scenario of application has aroused the interest of the Camera & Imaging Products Association (CIPA), instituted on Jul. 1, 2002 with the purpose of facilitating the development, production, and sale of standard photographic film cameras, digital photographic cameras and corresponding devices, instruments, and software.

CIPA has hence defined a standard, called Multiple Picture format of JPEG Objects, or more briefly MPO (Multiple-Picture Object).

The MPO format is constituted by a number of JPEG images; the MPO file includes multiple-image (MP) extensions that enable incorporation of a number of individual images in just one file, with the individual image having the same structure as the Exif JPEG data, namely:
  a Baseline MP file constituted by a primary image and a further duplicated image, all formatted for an optimal display on TV and other display devices; the MP Baseline file uses Exif extensions and specifies a file format including MP extensions that enable storage of the primary image and of one or more additional images;
  an Extended MP file, which consists of a collection of images corresponding to one of the MP types defined in this specification; in particular, an MP type is defined as Multi-view and has three subtypes: Panorama, Disparity, and Multi-Angle; with this file format it is also possible to store other images.

The format known as Exchangeable image file format (Exif) is a standard that specifies the format for the images, the sounds, and the accessory tags used by digital cameras (including smartphones), scanners, and other systems for handling image files and sounds recorded by digital cameras.

When the Exif format is used for JPEG files, the Exif datum is stored in one of the JPEG utilities Application Segments, namely, the APP1 segment (0xFFE1 segment marker), which contains within it an entire TIFF file.

The formats specified in the Exif standard are defined as folder structures that are based upon Exif-JPEG formats and formats for memory storage. When these formats are used as Exif/DCF files together with the DCF specification (for a better inter-operability between devices of different types), their field of application embraces the devices, the storage media, and the software that manages them.

In brief, the MPO files identify a format for storage of multiple images in just one file. That format implements a chain of JPEG files in a single file provided with appropriate tags that enable identification of the individual images and knowledge of their location within the multidimensional image.

In various techniques, the MPO files can be used to represent three-dimensional images, such as, for example, stereoscopic images. The MPO tags, then, contain not only the information of the individual images as JPEG files as such, but also a set of parameters useful to the decoders for generating the three-dimensional image made up of the individual images contained in the MPO file.

The stereoscopic images are obtained by combining two images of one and the same object viewed from two points set at a distance proportional to the human interpupillary distance.

These images are stored in an MPO file and provided with appropriate tags.

Each stereoscopic MPO file, then, occupies a space in memory approximately equal to twice the space occupied by just one JPEG image.

In addition, the two images stored regard one and the same object; it is thus evident that the information content of these images will be very similar, with the possibility of identifying a lot of redundant information.

Stereoscopic vision, considered in the general context just recalled, forms the subject of an ample scientific literature that deals, for example, with subjects such as:

use of Kohonen's WTA (Winner Take All) algorithm for improving the quality of the individual images in a stereoscopic image/video;

improvement of the quality and of the bandwidth of the stereoscopic video;

improvement of the reconstruction of stereoscopic video images by means of an estimation of the disparity between individual images; and encoding of stereoscopic images with methods based upon wavelets and the fractal theory.

It will likewise be appreciated that the MPO standard does not envisage in itself any level of compression.

Among the articles in question, the following may be mentioned, which are all incorporated by reference:

Various Authors: "Fast disparity estimation using geometric properties and selective sample decimation for stereoscopic image coding" IEEE Transactions on Consumer Electronics, Vol. 45, n. 1, pp. 203-209;

Coltekin, A.: "Space variant image coding for stereoscopic media"—Picture Coding Symposium, 2009, PCS 2009, pp. 1-4;

Strintzis, M. G.; Malassiotis, S.: "Object-based coding of stereoscopic and 3D image sequences"—IEEE Signal Processing Magazine, vol. 16, n. 3, pp. 14-28;

Zhu Zhongjie; Jiang Gangyi; Yu Mei; Wu Xunwei: "Fast disparity estimation algorithm for stereoscopic image sequence coding"—TENCON '02. Proceedings. 2002 IEEE Region 10 Conference on Computers, Communications, Control and Power Engineering, vol. 1, pp. 285-288;

Bensalma, R.; Larabi, M.-C: "Optimizing the disparity map by the integration of HVS binocular properties for efficient coding of stereoscopic images"—3DTV-Conference: The True Vision—Capture, Transmission and Display of 3D Video (3DTV-CON), 2010, pp. 1-4;

Mi-Hyun Kim; Kwang-Hoon Sohn: "Edge-preserving directional regularization technique for disparity estimation of stereoscopic images"—IEEE Transactions on Consumer Electronics, vol. 45, n. 3, pp. 804-811;

Boulgouris, N. V.; Strintzis, M. G.: "Embedded coding of stereo images"—Proceedings 2000 International Conference on Image Processing, 2000, vol. 3, pp. 640-643.

There thus exists a need to find embodiments that are able to lead to further improvements of the techniques described previously, for example, but not exclusively, in terms of efficiency of compression for the purposes of transmission and storage, without this being at the expense of the level of quality.

A purpose of various embodiments is to respond to said need.

Various embodiments may regard:
a method for encoding a stereoscopic image;
a method for decoding a stereoscopic image;
an encoder configured for encoding a stereoscopic image;
a decoder configured for decoding a stereoscopic image;
a computer program product that can be loaded into the memory of at least one computer and that includes portions of software code for implementing the steps of an encoding method;
a computer program product that can be loaded into the memory of at least one computer and includes portions of software code for implementing the steps of a decoding method; and
a carrier, such as for example a storage or transmission carrier, which carries a stereoscopic image.

The reference to a computer program product that can be loaded into the memory of at least one computer and includes portions of software code that can implement steps of an embodiment of a method when the product is run on at least one computer is here understood as being equivalent to the reference to a computer-readable means containing instructions for control of the processing system for co-ordinating implementation of a method according to an embodiment. The reference to "at least one computer" is meant to highlight the possibility of obtaining various embodiments of a modular or distributed type.

Various embodiments may entail alternatives for encoding and decoding MPO files.

Various embodiments may entail the creation of a library for managing and handling the MPO files.

Various embodiments may be based upon the drop in the quality of one of the two images, which immediately entails a saving in terms of memory.

In various embodiments, a "low-quality" image may be improved by means of a decoding algorithm based upon the information contained for the high-quality image.

Various embodiments may entail the development of a procedure for the improvement of an image that exploits the information contained in another image closely correlated to the first image.

In various embodiments, such a procedure may enable a saving in terms of memory for filing MPO files that are constituted by a chain of correlated images and implement stereoscopic images.

Various embodiments may be based upon the recognition of the fact that a pair of images (photograms) captured by two lenses set at a distance apart so as to simulate human binocular vision can present many parts in common so that redundant data are present in them. In various embodiments, a procedure of reconstruction may exploit this redundancy for reconstructing one of the two images previously degraded.

In various embodiments, such a reconstruction procedure may enable a considerable saving in terms of storage space without inducing an appreciable loss of quality.

BRIEF DESCRIPTION OF THE DRAWINGS

Various embodiments will now be described, purely by way of non-limiting example, with reference to the following annexed figures.

DETAILED DESCRIPTION

Figure 1:
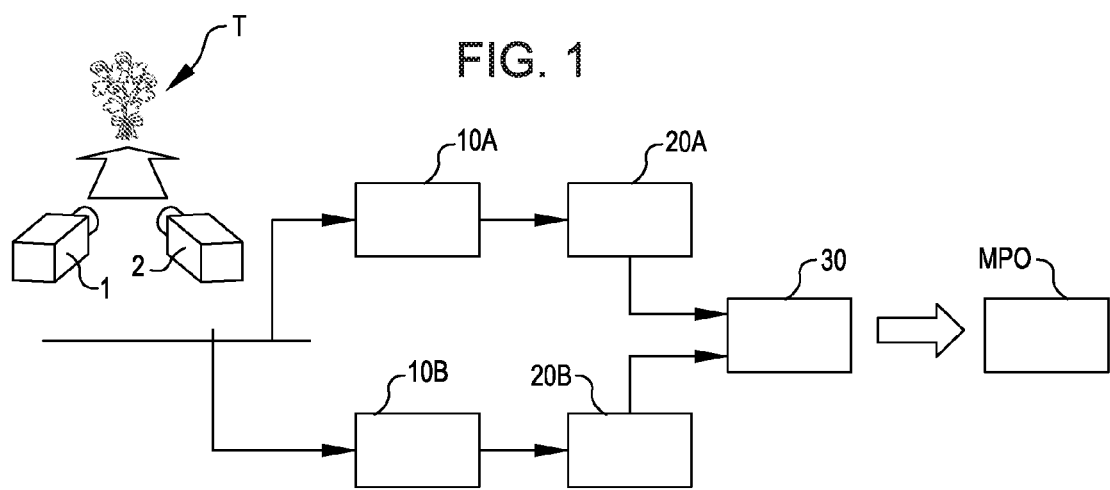
FIG. 1 is an overall block diagram of a device for encoding stereoscopic images, according to an embodiment.

Illustrated in the ensuing description are various specific details aimed at providing an in-depth understanding of various exemplary embodiments. The embodiments may be obtained without one or more of the specific details, or with other methods, components, materials, etc. In other cases, known structures, materials, or operations are not illustrated or described in detail so that the various aspects of the embodiments will not be obscured.

The reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in various points of this description do not necessarily refer to one and the same embodiment. Moreover, particular conformations, structures, or characteristics may be combined in any adequate way in one or more embodiments.

The references used herein are provided merely for convenience and hence do not define the sphere of protection or scope of the embodiments.

The overview on stereoscopy and analysis of the MPO format presented in the introductory part of this description is considered to all effects an integral part of the present detailed description.

As already noted previously, the performance and potential of digital photographic cameras have witnessed a rapid evolution in the last few years. The field of digital photography has spread up to including products such as TVs, telecommunication devices, and other hardware and software applications. This phenomenon has brought with it new applications for digital photography, many of which require the use of multiple correlated images to represent a particular photographic experience. The Multi-Picture Object (MPO) format has been precisely developed to meet this need, defining a method for storage of multiple images and meta-data associated in a single file.

As has already at least in part been said, MPO specifies a data format, used by digital photographic cameras, which implements a chain of images stored in a single file by adding tags that will subsequently enable these images to be associated and used appropriately.

The meta-data of the MPO format are stored in the APP2 application segment of each individual image. Furthermore, the first image contains a field called MP index IFD, which describes the structure of the entire MPO file, the correlation between the individual images, and their position within the file.

Each individual image has the same structure as an ExifJPEG file. Exif is a specification for image files that adds to the existing formats (JPEG, TIFF, and reFF) specific tags containing meta-data.

Some of these meta-data may be:
information of date and time;
settings of the photographic camera;
a miniature for displaying a preview, i.e., a "thumbnail," for example on a camera's LCD display;
geographical information;
descriptions and information on copyright.

The Exif format presents a certain number of disadvantages, linked above all to the structure of the Exif data.

For example, in the specification of the Exif standard, the depth of color is always 24 bits, whilst many cameras are today able to capture much more data, e.g., 36 bits of color per pixel.

The Exif specification also includes a description FPXR (FlashPix-Ready) that can be recorded in the APP2 of a JPEG image. This aspect can be in contradiction with the definition of the structure of the MPO format, which uses the APP2 for storage of its meta-data. Hence, the programs that handle MPO files and are called upon to handle this eventuality must take into account the fact that the reference standard for MPO files does not specify any Application Segment alternative to APP2 for storage of its meta-data.

Each MPO is constituted by at least two individual images, each of which is delimited by two markers, SOI (Start Of Image) and EOI (End Of Image). Present between these two markers are the application segment APP1, containing the Exif data, the application segment APP2, containing the MPO data, and finally the fields for the image proper according to JPEG encoding. Moreover, only for the first individual image, the APP2 application segment includes a field called MP index IFD. The latter contains all the information that describes the summary structure of the individual images within the file.

Within APP2, in addition to the MP index IFD, there can be a further field called MP Attribute IFD. The field MP Attribute IFD, if present, contains a set of meta-data for the individual image that are useful during the step of reproduction of the image itself. The level of functionality (Tag Support Level) of these tags depends upon the type of individual image that is useful. The type of individual image is specified by a subset of bits of the field Individual image Attribute.

For each individual image there exists a 4-byte field, called Individual image Attribute, stored within the field MP Entry.
Said field is constituted by 6 parts:
Dependent Parent Image Flag: this flag has value 1 if the individual image is the parent image of another individual image; otherwise, this flag has value 0.
Dependent Child Image Flag: this flag has value 1 if the individual image is the child image of another individual image; otherwise, this flag has value 0.
Representative Image Flag: this flag has value 1 if the individual image is the representative image of the MPO file; otherwise, this flag has value 0. There can be only one individual image with this flag equal to 1 in one and the same MPO file.
a 3-bit reserved field.
Image Data Format: this 3-bit code specifies the data format of the individual image; the JPEG format corresponds to the value 0.

MP Type Code: this code specifies the type of individual image.

Within the MP Type field Code, 4 parts are present:
a 4-bit reserved field;
a field Type Info;
a 12-bit reserved field; and
a field known as Sub-Type.

On the basis of these considerations, it is possible to identify three classes and five subclasses of individual images:
Baseline MP Primary Image
Large Thumbnail
Class 1
Class 2
Multi-Frame Image
Panorama
Disparity
Multi-Angle The individual images that make up an MPO file for a stereoscopic image have the field MP Type equal to the hexadecimal value 020002, i.e., they are of the Disparity Image type. In this case, the tag MP Individual image Number is compulsory; i.e., its level of functionality (Tag Support Level) is Conditionally Mandatory.

The value of this tag represents the number of the viewpoint that identifies the position and the sequence of the lens (viewpoint) during filming. The value of the tag MP Individual image Number starts with 1. The values of these tags in the Disparity Images are numbered starting from the viewpoint furthest to the left, with value 1, up to the one furthest to the right. For the stereoscopic images we thus have two individual images; the first will have the tag MP Individual image Number equal to 1, the second equal to 2.

Another tag MP Attribute IFD envisaged for the Disparity Images is the tag Base Viewpoint Number. This tag can be mandatory for the images of the Multi-Frame type, i.e., for the individual image of the Disparity type and Multi-Angle Image type. The meaning of this parameter depends upon the type of image. For stereoscopic images (of the Disparity Image type), the viewpoint number is the value of the MP Individual image Number of the base viewpoint. The base viewpoint is the reference point from which the angles of convergence, divergence, and the other parameters regarding the position of the different viewpoints that make up a multidimensional image are measured. It is hence evident why this field can be mandatory: the spatial parameters of each individual image are measurements that require a single reference point that is the same for all.

For instance, in the case of Disparity Image with four viewpoints, there can be indicated corresponding values of Convergence Angle (e.g., −2°, 2° and 4°) and Baseline Length (e.g., 65, 65 and 130 mm). The values of the Convergence Angle can be measured by taking as reference the axis that joins the base viewpoint and the target, whilst the values of Baseline Length correspond to the distance, in millimeters, from the base viewpoint. In this example, all the individual images can have as the Base Viewpoint Number the value 2, i.e., the value of MP Individual image Number of the base viewpoint.

What has been said above regards the known art and hence renders any further detailed description superfluous.

It is noted that the two images included in a stereoscopic MPO file can be very similar so that, by calculating the difference between the values of the two images, very low numbers are usually obtained, with many values close to zero.

It is also noted that, by implementing an encoding that detects the difference between the values of the two images, it is possible to achieve very satisfactory results from the standpoint of saving of memory; however, the loss of quality caused principally by JPEG encoding of the processed data may, at least in some cases, be excessive.

It is noted that it is possible to reduce the quality of one of the two images in order to obtain an immediate saving in memory: subsequently, the "low-quality" image can be improved by means of a decoding procedure that exploits the information contained in the "high-quality" image. A reconstruction method of this type can be based upon the calculation of the arithmetic mean between the data of the high-quality image and those of the compressed image.

This procedure can lead to better results as compared to differential encoding, but the image reconstructed starting from the compressed data may present defects in the regions of greater difference between the two images. Said defects can be eliminated using a parameterized exponentially-weighted moving average (EWMA) model.

In various embodiments, it is possible to use the Kohonen block reconstruction (KBR) combined with a search for the pattern by means of normalized cross correlation between the compressed image and the correlated one.

In various embodiments, the latter method has led to better results than the previous ones.

Various embodiments may then exploit the redundancy between the pairs of images of an MPO file for reconstructing one of the two images that has been previously degraded.

At the level of filming devices it is possible to implement a pipeline and in the step of encoding of the MPO file it is possible to set the value of MP Format Identifier to 0x4D504643 causing the dimension of the second individual image to be the same as that of the low-quality compressed image.

In the display step, it may be considered to apply a decoding algorithm for reconstructing the second image and thus obtaining the stereoscopic image. On this aspect, it is noted that the two images making up a stereoscopic image obtained by capturing two photograms with two lenses set at a distance differ for a certain angle on the axis z. Although they are different, they have many parts in common.

It may then be considered to define the object (or target) that is to be photographed. In general, the lenses of video cameras capture, together with the target, a series of objects present in the surrounding environment. The target will always be contained in the two images whilst the other elements in the middle ground and in the background may or may not appear in each of the two images; or else, as frequently happens, in the two stereoscopic images there will appear different parts of the same objects.

Although they are different, the two images can present parts in common in the central area (target), whilst close to the edges, even considerable differences may be present owing to the fact that one of the two filming lenses frames objects or parts of them that are not framed by the other. The biggest differences, then, regard the background and the objects in the middle ground: both of the lenses are centered on the target and the variation of just the axis z can cause a marked rotation of the objects far from the center.

Assume, by way of example, that the target is a vase of flowers located on a table.

It may thus happen that, for example:
the image on the right contains objects that are not framed in the image on the left, e.g.: a window and a tree on the outside, a chandelier, the edge of a divanette;
in the image on the left there are present, for example, parts of a piece of furniture not visible in the image on the right, whilst a wall in the background is less lit up than in the image on the right.

Again, alongside parts, for example, of the target framed in both of the images, various objects, for example a chair, may be present in both of the images but in slightly different positions.

To sum up, the two images that make up a stereoscopic image can have many parts in common concentrated in the central area and some parts very different close to the edges. The objects of one image that are present also in the other are in a slightly different position: the amount of said deviation increases as we move away from the center and, if the deviation is high, it may happen that certain objects present in one image are not displayed in the other. Since it is a complex transfiguration, which is the result of the combination of a number of transformations and not of a simple translation, said objects will not be exactly the same but will be very similar.

In a standard treatment chain (e.g., a pipeline) for creating an MPO file, the device captures two images, which are subsequently compressed according to the JPEG standard and assembled by the encoder, which enters the appropriate tags and generates the final MPO file.

A embodiment of this type is schematically represented in FIG. 1, where two devices for detecting images are present (for example, two photographic cameras 1 and 2), which generate two respective (single) image signals 10A and 10B for a target designated by T. These signals (which will be assumed as being in digital form, for example expressed in the form of an array of pixels) are sent to respective (JPEG or equivalent) encoding modules 20A, 20B, and the encoded signals are sent to an MPO encoding module, designated by 30, which produces the MPO file by putting together the two encoded images.

In various embodiments, this scheme may be obtained in the form of a pipeline implemented directly in the device that performs the JPEG compression and encoding of the MPO file immediately after capturing the two images or photograms.

It is noted that a disadvantage of this pipeline regards the space in memory necessary for storage of an MPO file, which is approximately twice the size of an individual JPEG image.

Various embodiments may consequently envisage using a different treatment structure (e.g., a pipeline), where the JPEG compression of the second individual image 10B is made with a lower level of quality. As a result, the resulting MPO file, designated in the figure as MPO-C (FIG. 2), will occupy less space in memory.

A possible embodiment is schematically represented in FIG. 2, where once again two devices for detecting the images are present (for example, two photographic cameras 1 and 2), which generate two respective (single) image signals 10A and 10B for a target designated by T. With a view to sending it to the encoding module 30, whilst an image (the right-hand one or, respectively, the left-hand one) is sent, as in the case of FIG. 1, to the encoding module 20A, the other image (the left-hand one or, respectively, the right-hand one) is sent to an encoding module 200B of lower quality operating according to the criteria more fully described in what follows.

The expressions "the right-hand one or, respectively, the left-hand one" and "the left-hand one or, respectively, the right-hand one" are intended to indicate the fact that, in various embodiments, which image (the right-hand one or the left-hand one) is subjected to such a treatment (normal quality or lower quality) may be altogether indifferent.

Figure 2:
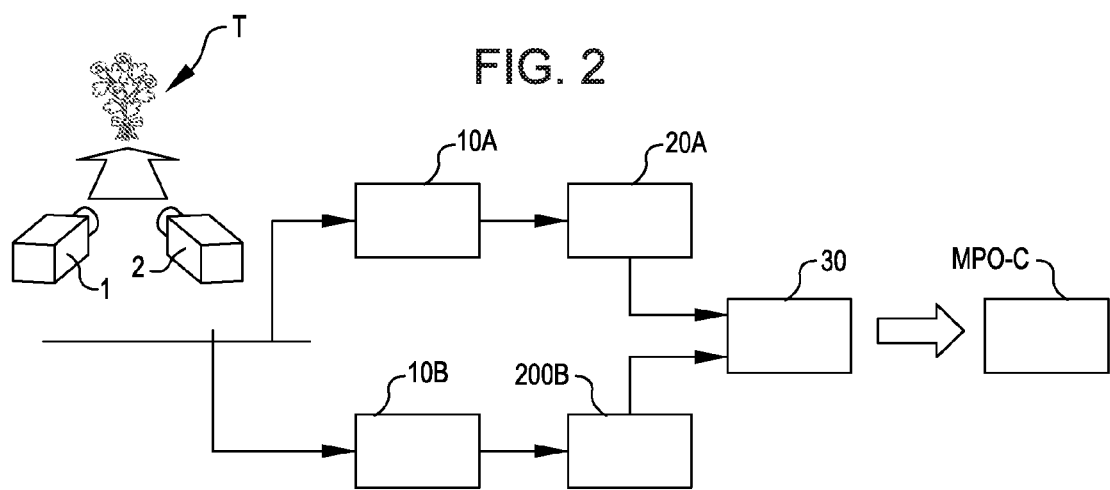
FIG. 2 is an overall block diagram of an encoding device according to an embodiment.

The fact that the file produced by the MPO encoder is here designated as MPO-C is intended to highlight the fact that, in various possible embodiments of the example considered in FIG. 2, the resulting MPO file may have the tag MP Format Identifier set at the hexadecimal value 0x4D504643, which corresponds to the string of 4 ASCII bytes "MPFC", whereas in the example considered in FIG. 1 the MPO file usually has the tag MP Format Identifier equal to 0x4D504600 ("MPF").

The tag in question identifies, in fact, the format of the file, and the addition of the character 'C' can indicate that it is a Compressed MPO file.

The term "low", referring to the quality, is used here in a relative sense to indicate that the encoding implemented in block 200B has a lower quality than the encoding implemented in block 20A. Said lower quality may be "recovered" during decoding according to the criteria more fully exemplified in what follows.

For example, the table below sets in comparison different levels of quality that can be obtained in a JPEG encoding starting from a maximum level (Q=100) and passing progressively to lower levels of quality until a minimum level (Q=1) is reached.

| Quality | Dimensions (bytes) | Compression ratio |
|---|---|---|
| Highest quality (Q = 100) | 83,261 | 2.6:1 |
| High quality (Q = 50) | 15,138 | 15:1 |
| Medium quality (Q = 25) | 9,553 | 23:1 |
| Low quality (Q = 10) | 4,787 | 46:1 |
| Lowest quality (Q = 1) | 1,523 | 144:1 |

Figure 3:
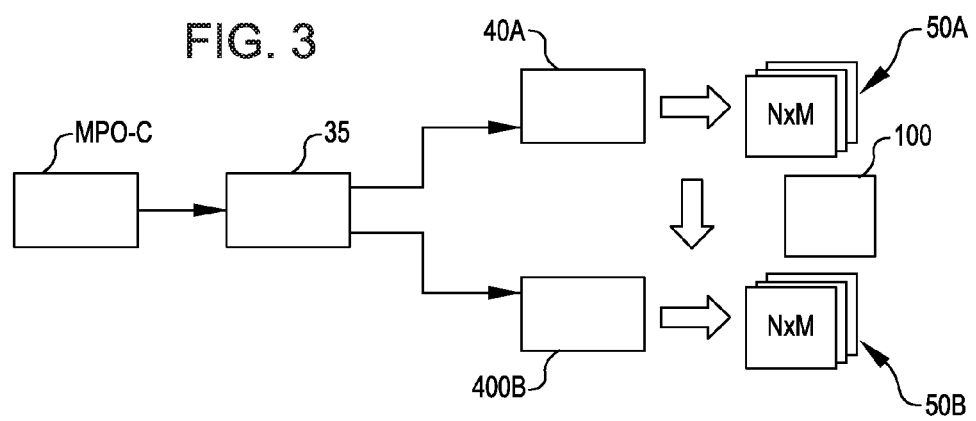
FIG. 3 is an overall block diagram of a decoding device according to an embodiment.

In various embodiments, during decoding the file MPO-C it is possible to operate according to the criteria schematically represented in FIG. 3.

From the file MPO-C there are obtained at input—for example, using an MPO parser of a known type, designated by 35—the components for the first individual image A (the right-hand one or the left-hand one) and for the second individual image B (the left-hand one or the right-hand one). The first image is subjected to "normal" decoding (e.g., JPEG or equivalent) in a decoding module 40A. The second image is instead subjected to a "lower quality" decoding in a decoding module 400B.

In both cases, the result will be an image 50A, 50B (which also in this case will be assumed as being in digital form, for example in the form of arrays of pixels) that may be viewed as being divided into blocks of smaller dimensions.

As already mentioned, in various embodiments, during decoding it is possible to extract the two individual images 50A, 50B, and the image with lower quality 50B can be improved (with the function indicated as a whole by block 100 of FIG. 3) using the information contained in the high-quality image 50A.

In various embodiments, the parts in common may be reconstructed and improved, and for the ones not in common the image with lower quality may be used.

This mode of operation may be viewed as a possible cause of loss of information linked to the use of embodiments. However, the analysis on stereoscopic images shows that, in various embodiments, the loss of quality may be negligible.

In various embodiments, the approach of encoding and decoding of the MPO files may exploit the redundancy contained in the stereoscopic images: considering the high information content of the high-quality image (20A of FIG. 2), it is possible to reduce considerably the quality of the second image 200B (hence reducing, for example, the space that this will occupy in the memory) and then, during decoding, improve the quality thereof by exploiting the information in common preserved in the high-quality image.

To pass then to exemplifying possible specific modalities and embodiments, in what follows the higher-quality image will be referred to as image A, whereas the lower-quality image will be referred as image B.

Figure 4:
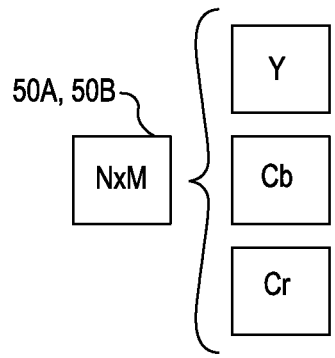
FIGS. 4 to 8 are functional block diagrams according to embodiments.

For example, in various embodiments, as exemplified in FIG. 4, each image 50A, 50B may be viewed as divided into blocks of smaller dimensions, with each block constituted by three N×M matrices, one for each channel (Y=luminance, Cb and Cr=blue-difference and red-difference chrominance components, respectively); the elements of these matrices are called "samples".

The decoding procedure described here by way of example reconstructs one block at a time and, for each block considered, the matrices of all three of the channels are processed one after the other.

The ensuing description illustrates in detail the decoding for an N×M block. In particular, FIG. 5 et seq. refer to the treatment of an N×M matrix for the luminance channel of a given block of the image 50B that is to be decoded by reconstructing the information initially lost on account of the low-quality compression.

The same operations exemplified herein for the block Y block for the luminance may be carried out for decoding the matrices of the other channels of the same block (i.e., Cb block and Cr block in FIG. 5), and the entire procedure may be repeated for each (sub)block of the image 50B.

For reconstructing, in the example considered herein, the block Y block, a block is sought of the same dimensions as the image 50A obtained by means of a similarity function Match Similar or MS.

Figure 5:
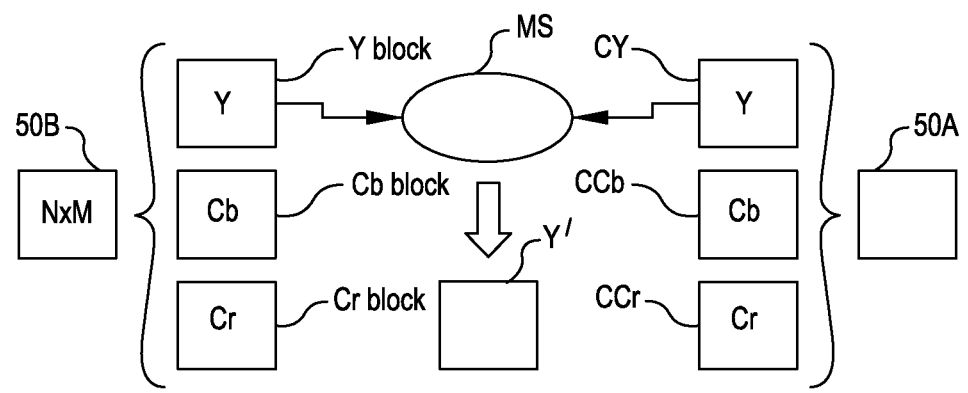

The function MS has the task of obtaining a matrix that is as similar as possible to the block Y block that is to be reconstructed by attempting to use the information of the image 50A for the channel considered, i.e., in the example considered here, the information of the luminance matrix of the image 50A represented in FIG. 5 by the matrix CY.

In various embodiments, the similarity function MS may then consider different types of candidate blocks.

In various embodiments, it is possible to determine not only one, but more than one, type of candidates and the best among the candidates is returned by the function MS to the caller function.

In practice (see once again FIG. 5), the function MS may receive at input a matrix CY of the image 50A, and return a matrix Y' of size N×M.

In various embodiments, a (first) type of candidate may be obtained by seeking within the image 50A a matrix similar to Y block.

In various embodiments, this search may be made by calculating the normalized cross correlation between the block to be sought and the matrix of the channel considered of the image 50A.

The normalized cross correlation is given by the following equation:

$$\gamma(u, v) = \frac{\sum_{x,y} [f(x, y) - \bar{f}_{u,v}][t(x - u, y - v) - \bar{t}]}{\left\{ \sum_{x,y} [f(x, y) - \bar{f}_{u,v}]^2 \sum_{x,y} [t(x - u, y - v) - \bar{t}]^2 \right\}^{0.5}} \quad (1)$$

where:
  f is the matrix of the image 50A for the channel considered (CY);
  $\bar{t}$ is the mean value of the matrix to be sought (the block Y block);
  $\bar{f}_{u,v}$ is the mean value of f(x,y) in the region of Y block.

Figure 6:
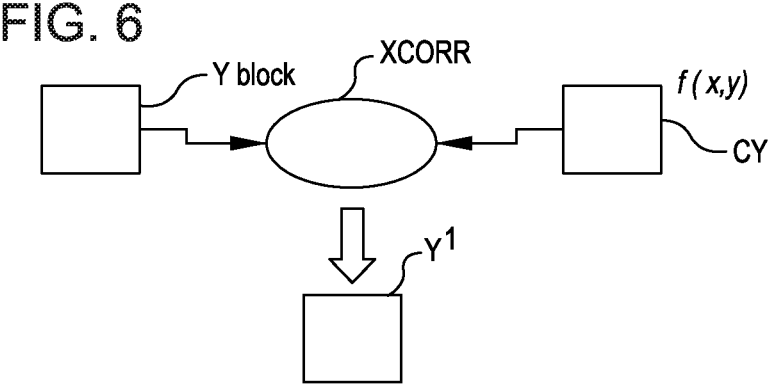

As schematically represented in FIG. 6, in the example considered here (which, it is emphasized, is merely an example) the first candidate within the function MS, designated by Y1 in FIG. 6, is sought by calculating the normalized cross correlation XCORR between Y block (image 50B) and the channel CY (image 50A).

The cross correlation XCORR then returns the subset of the matrix CY that most closely approximates Y block.

If the cross correlation XCORR identifies a block of dimensions smaller than those of Y block, i.e., it identifies only a part of this, the procedure completes the block using for the missing values the ones already available for Y block.

In various embodiments, a (second) type of candidate of the function MS may be obtained from the N×M block of the image 50A (once again this example regards the luminance component Y, but in various embodiments it may also apply to the chrominance components Cb and Cr) that is in the same position as the block of the image 50B considered (i.e., the block of which the block Y block forms part).

Figure 7:
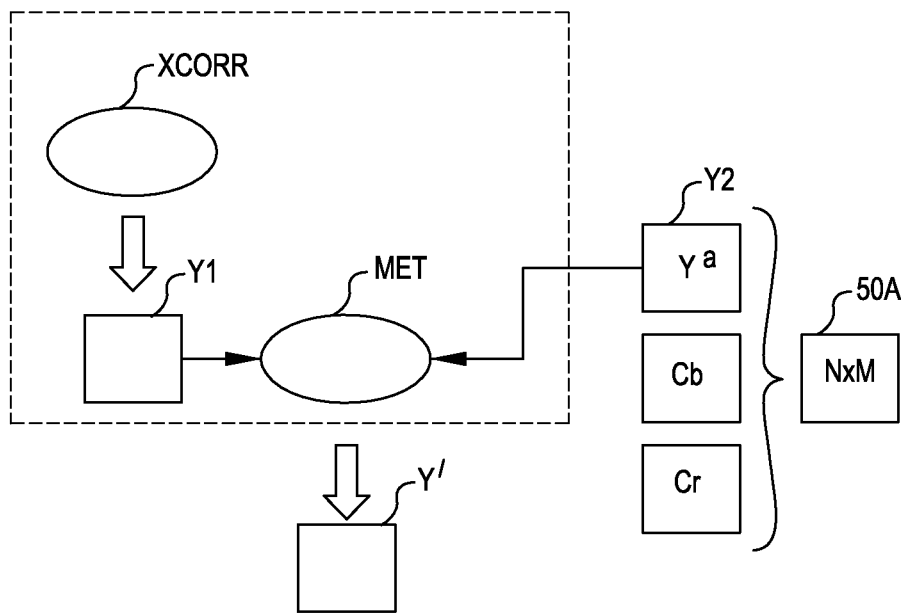

Hence, as represented in FIG. 7, in various embodiments it is possible to determine not only one, but both of the two types of candidate blocks Y1 and Y2, and the function MS chooses the one that between the two minimizes an established metric (MET in FIG. 7).

For example, in various embodiments, to establish which of the two candidates Y1, Y2 to use, the function MS may calculate, for each candidate block, the mean of the differences of its samples with those of Y block, i.e., calculate the mean of the deviations between the candidate block and the block that is to be reconstructed. For example, the chosen block Y' may be the one with the lowest mean.

In various embodiments, the function MS may repeat the same operations for the matrices of the other two channels of the block that it has received at input (Cb block and Cr block) and return to the caller function an N×M block containing the three matrices found.

In various embodiments, the luminance matrix of the block chosen by the function MS may be used for improving Y block.

In various embodiments, the method used may be the Kohonen reconstruction, as described, for example, in one or more of the following references, each of which is incorporated by reference:

Kohonen T.: "The self-organizing map", Proceedings of the IEEE, Vol. 78, Issue 9, 1990, pp. 1464-1480;

Kohonen, T.; Oja, E.; Simula, O.; Visa, A.; Kangas, J.: "Engineering applications of the self-organizing map", Proceedings of the IEEE, Vol. 84, Issue 10, 1996, pp. 1358-1384;

Nasrabadi, N. M.; Feng, Y.: "Vector quantization of images based upon the Kohonen self-organizing feature maps", IEEE Proceedings of International Conference on Neural Networks, 1988, vol. 1, pp. 101-108;

Ritter, H.; Schulten, K., "Kohonen's self-organizing maps: exploring their computational capabilities", IEEE Proceedings of International Conference on Neural Networks, 1988, pp. 109-116.

In various embodiments, the Kohonen reconstruction (KBR) can use the following formula:

$$b''_{i,j} = \begin{cases} b_{i,j} + \gamma \cdot (b_{i,j} - b'_{i,j}) &, (b_{i,j} - b'_{i,j}) < \text{limit} \\ b_{i,j} &, \text{otherwise} \end{cases} \quad (2)$$

where:
- $b''_{i,j}$ is the reconstructed sample;
- $b'_{i,j}$ is the sample of the candidate block chosen by the function MS (Y');
- $b_{i,j}$ is the sample of the block to be improved (Y block);
- $\gamma = 0.25$;
- limit=0.043.

Figure 8:
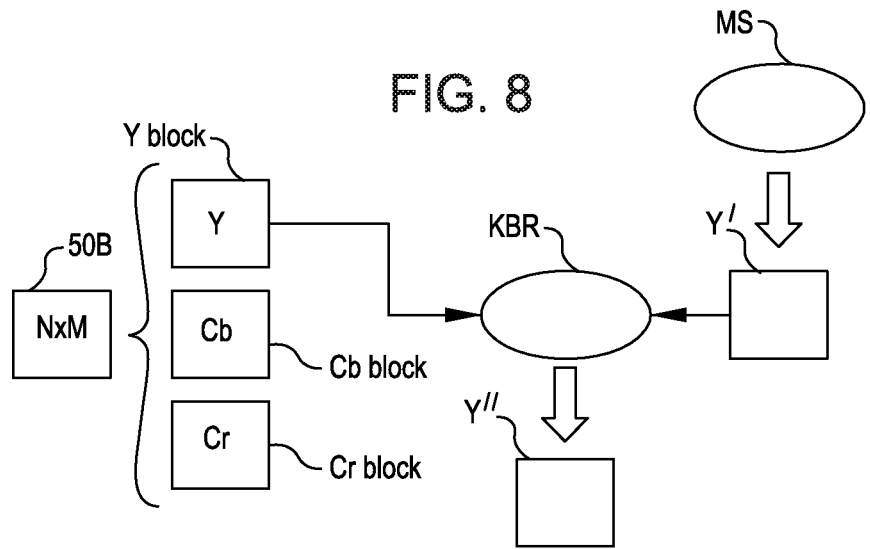

This function works sample by sample and, after processing all the samples of the matrix Y block to be reconstructed using the values of the matrix Y', it returns a resulting matrix called Y'': see in this regard FIG. 8, which is a schematic representation of an example in which the result of the decoding procedure is the matrix Y'', obtained by improving the samples of Y block using the Kohonen reconstruction KBR and the matrix Y'.

In various embodiments, the procedure described may be repeated for the other matrices of the block in question (i.e., for the remaining two channels), and the reconstruction terminates after reconstructing all the blocks of the image 50B that will make up the reconstructed image.

In various embodiments, to speed up and render less demanding in terms of time of execution the calculation of the normalized cross correlation XCORR, the calculation of the normalized cross correlation between Y block and CY may be made using a subset of CY obtained considering a neighborhood centred on the position of the block of which Y block forms part. In various embodiments, this choice may reduce considerably the processing times without jeopardizing the efficiency or the efficacy of the results.

In terms of evaluation of the computational complexity, the image to be improved (image 50B) may be viewed as an array of n elements, where each element represents a pixel. For simplicity of illustration, it may be assumed that the sub-blocks are N×N square matrices with N<<n and that the image is also square or rectangular.

Denoting by H and W, respectively, the height and the width of the image, we will have (for a square image)

$$H = W = \sqrt{n}$$

In each row there will be $$R = \frac{W}{N} = \frac{\sqrt{n}}{N}$$

blocks, and in each column there will be $$C = \frac{H}{N} = \frac{\sqrt{n}}{N}$$

blocks.

The function used for calculating the normalized cross correlation XCORR, called normxcorr, calculates n coefficients by visiting the entire matrix for each coefficient calculated; hence:
- the number of computations is n; i.e., it calculates n coefficients;
- for each computation the entire matrix of the channel considered (n samples) is visited.

The asymptotic complexity of just the function normxcorr is $$n \cdot O(n) = O(n^2)$$

By applying the optimization illustrated previously, the procedure, instead of visiting the entire matrix (of dimension n) visits a neighbourhood of the block. In the worst case, said neighborhood has a radius equal to 2N so that in the worst case it will have a dimension of 25·N·N samples.

Since N is an arbitrary constant, it can be chosen so that $N \cdot N = O(\sqrt{n})$ and the complexity of normxcorr resulting from said optimization can be determined in the following terms:
- the number of computations is 25·N·N, i.e., 25·N·N coefficients are calculated;
- for each computation a subset of the matrix of the channel considered is visited having maximum dimensions 25·N·N;

hence $$(25 \cdot N \cdot N) \cdot (25 \cdot N \cdot N) = (25 \cdot O(\sqrt{n})) \cdot (25 \cdot O(\sqrt{n})) \leq \leq O(n)$$

$$T(n)_{normx} = O(n)$$

since $N \cdot N = O(\sqrt{n})$

By increasing N (dimension of the sub-block) the product (25·N·N)·(25·N·N) increases; i.e., the neighborhood of radius 2N increases, and also the complexity increases.

However, as N increases, the number of calls to normxcorr, which, as said previously, represents the most burdensome part of the procedure, decreases. Furthermore, the value of the multiplicative constants is very low in so far as the worst case occurs only for a few central blocks, i.e., only where it is possible to have a radius equal to 2N.

It has been found that, in various embodiments, it is possible to reduce the processing times of the entire decoding on average by 54%, without any loss of quality.

In various embodiments, for calculating the cross correlation it is also possible to resort to the method described in J. P. Lewis, "Fast Normalized Cross-Correlation", Industrial Light & Magic, 1995, which is incorporated by reference.

As mentioned previously, various embodiments may envisage the use of the similarity function MS and of the Kohonen reconstruction KBR.

In the examples considered herein, the function MS may receive at input an N×N block, in turn constituted by three N×N matrices, one for each channel, and the image 50A. After a step of initialization of the parameters, within an execution of the function MS the cross correlation is calculated for each matrix (Y, Cb, Cr) of the block passed as parameter. Hence, three calls to the function normxcorr are made.

The asymptotic complexity of the function MS is consequently $$T(n)_{match} = O(1) + 3 \cdot T(n)_{normx} = O(1) + 3 \cdot O(n) = O(n)$$

In the examples considered here, the function that implements the Kohonen reconstruction may receive at input two N×N blocks; the first is the block to be reconstructed, whilst the second is the block obtained from the function MS. Each of these blocks can be constituted by three N×N matrices, and, as described previously, that the function processes one sample at a time. The equation used for the reconstruction has a constant cost, so that there is a number of operations proportional to:

$$T(n)_{Kohonen} = O(1) + 3 \cdot N \cdot N \cdot O(1) = O(N^2) = O(\sqrt{n})$$

In various exemplary embodiments, the entire decoding procedure may divide the image 50B into R·C sub-blocks and, for each sub-block, invoke the function MS and the Kohonen reconstruction KBR.

Hence, the computational cost of decoding is given by $$T(n) = R \cdot C \cdot (T(n)_{match} + T(n)_{Kohonen}) \leq$$
$$R \cdot C \cdot (\sqrt{n} + n) \leq$$
$$\sqrt{n} \cdot (\sqrt{n} + n) = n + n\sqrt{n} = O(n\sqrt{n})$$

where the last passage has been obtained considering $$R \cdot C = \frac{\sqrt{n}}{N} \cdot \frac{\sqrt{n}}{N} \leq \frac{\sqrt{n}\sqrt{n}}{\sqrt{n}} = O(\sqrt{n})$$

Consequently, the asymptotic complexity of the (optimized) decoding procedure is $$T(n) = O(n\sqrt{n}).$$

Various verifications have been carried out such as to embrace 23 MPO files as available on-line at the date of filing of the present patent application at URL www.3dmedia.com/gallery.

In the verifications made, the image with highest quality, hence—in relative terms—with "high" quality, has been encoded with a compression quality not lower than JPEG 85. The image with poorer quality, hence—in relative terms—with "low" quality, has been encoded both with quality 65 and with quality 70 (see the table given previously) for a comparison of the performance of the procedure in the two cases.

From the verifications made, it has been seen that the use, for the lower-quality image, of a quality lower than 65 may in various embodiments lead to an overly marked loss of information. Instead, use of a quality higher than 70 may in various embodiments lead to a saving in memory that is too low.

In various embodiments, by reducing the compression quality, the advantage in terms of memory saving increases, but in various embodiments this may lead to an increase in the average loss of quality.

The loss may be evaluated in quantitative terms by comparing the PSNR (Peak Signal-to-Noise Ratio) of the reconstructed image (with respect to the original) and the same image obtained simply by using the JPEG compression at quality 85.

For example, it is possible to calculate the PSNR considering the initial image that is in the original non-compressed MPO file, as if it were the original image sample. The latter is in fact obtained by decompressing the JPEG image of the original non-compressed MPO file. In various embodiments, the procedure described here makes it possible to work on this image, proceeding to a "low" quality JPEG re-compression with subsequent decompression and reconstruction by means of the methods described. The image thus obtained after decoding and subsequent reconstruction by means of one or more of the embodiments proposed may be compared with the original one that is in the original non-compressed MPO file and from which we have started to apply an embodiment described here.

The PSNR thus calculated enables evaluation of the percentage of loss of quality that is obtained by applying the procedure described herein to the original non-compressed MPO file, thus enabling evaluation of the potential of an embodiment described herein, integrated, for example, in an image-acquisition pipeline.

The formula for calculating PSNR is $$PSNR = 10 \cdot \log_{10} \frac{sup^2}{MSE} \qquad (3)$$

where $$MSE = \frac{\sum_{i}^{W} \sum_{j}^{H} (b_{ij} - a_{ij})^2}{H \cdot W} \qquad (4)$$

$b_{ij}$ is the value of the sample of the image of which the PSNR is to be calculated (in the matrix of the channel considered);

$a_{ij}$ is the value of the sample of the original image;

sup is the maximum value that may be assumed by a sample expressed with 1 byte, equal to 255.

The average loss is given by the average of the differences between the values of PSNR of the reconstructed image and the one encoded with quality 85.

Average values of memory saving and of loss of quality according to the compression quality are represented in the following table.

| Low quality | Average saving | Loss (dB) |
|---|---|---|
| 65 | 38.7% | 2.39 |
| 70 | 32.8% | 2.16 |

Even though the average values calculated on twenty three (23) images are similar, the performance may vary for each image, and the difference between the two cases is more evident by comparing said variability.

By compressing with quality 65, we obtain a saving in memory of from 35% to 48.7% and a loss that ranges from 1.66 dB to 2.76 dB. By compressing with quality 70 we obtain a saving in memory of from 30% to 42% and a loss that ranges from 1.32 dB to 2.76 dB.

In various embodiments, it is possible to obtain a saving that exceeds 41%, with a loss of quality lower than 2 dB; in particularly unfavorable situations, we obtain a saving of approximately 30% and a loss that does not exceed 2.76 dB, but also in these cases the procedure proves efficient.

Various embodiments are suited to the use of a C library for management and handling of the MPO files called.

In a possible exemplary embodiment, it is possible to instantiate a variable of the MPO_data type, associating thereto an MPO file via a function defined in mpo-source.h, and carry out a parsing of the file for populating the structure MPO_data; the function that carries out parsing of an MPO file, defined in mpo-parse.h, can be implemented in a source MPO_parse_data.c.

In various embodiments, it is possible (for example by instantiating a struct of the jpeg_decompress_struct type) to read the contents of an MPO file as if it were a JPEG image.

Since the first individual image is at the head of the file, it may be considered by the parser of the JPEG (block 35 in FIG. 3) as if it were the image to be analyzed, and the JPEG parser may see only one image that starts with SOI and finishes with EOI, and the rest is ignored since the parser expects to receive a JPEG file; hence, after it has encountered the marker EOI, it simply terminates.

Various embodiments may be suited to being used in embedded systems, i.e., electronic processing systems designed for a given application, frequently with a specialized hardware platform. The resources of an embedded system are limited, and it is not usually possible to perform a normal compilation in so far as on these devices it is not possible to execute a compiler or linker proper.

In various embodiments, to compile applications for embedded systems cross-compilation may be used, i.e., a technique with which a source code is compiled, to obtain a binary file executable on an architecture different from that of the machine on which the cross-compiler has been launched.

In various embodiments, it is possible to use a computer-technology platform constituted by the distribution of the Linux operating system on architecture ST40 (STLinux). ST40 systems are based upon a highly modular structure. Any implementation of the ST40 architecture, such as for example the chip ST40RA, is constituted by a certain number of modules that communicate with one another using one or more connections. This interconnection or intercoupling system, called superHyway, provides a mechanism for exchange of packets between the modules and is organized so as to maximize the performance of the system, minimizing the costs. The high connectivity of the architecture renders the ST40 devices very versatile and ideal for applications that require high performance and processing of a lot of data.

In various embodiments, the loss of quality is, in any case, modest and is not visible in the images reproduced by the video devices.

In various embodiments, it is possible to implement measures of processing optimization with a significant improvement in terms of asymptotic complexity, which may be confirmed also via the measurement of the processing times.

Various embodiments are suited to the creation of a C library for management and handling of the MPO files for a software platform that can be constituted by the STLinux operating system on an ST40 architecture. The library enables parsing of the MPO files and provides an interface (API) that includes a complete set of functions for their handling and for extracting the individual images.

Of course, without prejudice to the principles of the present disclosure, the details of construction and the embodiments may vary, even significantly, with respect to what has been illustrated herein purely by way of non-limiting example, without thereby departing from the sphere of protection that the present disclosure provides.

For example, various embodiments, such as those described above, may be performed in hardware, software, or firmware, or by or in a combination or subcombination of hardware, software, and firmware.

Furthermore, a system, such as a camera or smart phone, that includes an image-capture assembly (e.g., a pixel array and a lens subassembly) or an image display and a computing apparatus (e.g., a microprocessor or microcontroller) may be configured to encode or decode images according to various embodiments, such as those described above.

Moreover, although an embodiment is described for square images, the above-described embodiments may be adapted for use with rectangular images, such as rectangular images that are formed by square blocks of pixels or other image values.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A method, comprising:
    receiving a first image encoded according to a first quality level and a second image corresponding to the first image encoded according to a second quality level that is lower than the first quality level;
    decoding the encoded first image and a portion of the encoded second image;
    identifying portions of the decoded first image that correspond to the decoded portion of the second image;
    selecting a portion of said portions of the decoded first image based on the decoded portion of the second image; and
    improving the decoded portion of the second image based upon the selected portion of the decoded first image so that the improved decoded portion of the second image has a higher quality level than the second quality level.

2. The method of claim 1 wherein said receiving includes extracting the first and second encoded images from a file.

3. The method of claim 1 wherein: the first image is of a scene; and the second image is of a portion of the scene.

4. The method of claim 1 wherein: the first image is of a first view; and the second image is of a second view that intersects the first view.

5. The method of claim 1 wherein: the first image is encoded according to a first JPEG algorithm; and the second image is encoded according to a second JPEG algorithm.

6. The method of claim 1 wherein the corresponding portions of the decoded first image are in a same relative image position as the decoded portion of the second image.

7. The method of claim 1 wherein said selecting is based upon a similarity function.

8. The method of claim 7 wherein said selecting further comprises:
    calculating respective means of a deviation between each of the plurality of portions of the decoded first Image and the decoded portion of the second image; and
    selecting the portion of the decoded first image that yields the lowest of the calculated means for use in improving the decoded portion of the second image.

9. The method of claim 1 wherein improving the decoded portion of the second image comprises improving the decoded portion of the second image based upon a Kohonen reconstruction algorithm.

10. A decoding device comprising:
    a processor; and
    a memory in communication with said processor;
    wherein said processor is configured to perform:
    receiving a first image encoded according to a first quality level and a second image corresponding to the first image encoded according to a second quality level that is lower than the first quality level;
    decoding the encoded first image and a portion of the encoded second image;
    identifying portions of the decoded first image that correspond to the decoded portion of the second image;

selecting a portion of said portions of the decoded first image based on the decoded portion of the second image; and improving the decoded portion of the second image based upon the selected portion of the decoded first image so that the improved decoded portion of the second image has a higher quality level than the second quality level.

11. The decoding device of claim 10 wherein said receiving includes extracting the first and second encoded images from a file.

12. The decoding device of claim 10 wherein the first image is of a scene and the second image is of a portion of the scene.

13. The decoding device of claim 10 wherein the first image is of a first view and the second image is of a second view that intersects the first view.

14. The decoding device of claim 10 wherein the first image is encoded according to a first JPEG algorithm and the second image is encoded according to a second JPEG algorithm.

15. The decoding device of claim 10 wherein the corresponding portions of the decoded first image are in a same relative image position as the decoded portion of the second image.

16. The decoding device of claim 10 wherein said selecting is based upon a similarity function.

17. The decoding device of claim 16 wherein said selecting further comprises:

calculating respective means of a deviation between each of the plurality of portions of the decoded first image and the decoded portion of the second image; and selecting the portion of the decoded first image that yields the lowest of the calculated means for use in improving the decoded portion of the second image.

18. The decoding device of claim 10 wherein said improving further comprises improving the decoded portion of the second image based upon a Kohonen reconstruction algorithm.

19. A system comprising:
a processor;
a memory in communication with said processor; and
a camera coupled to said processor and configured to generate a first image and a second image;
wherein said processor is configured to perform:
generating an encoded first image by encoding the first image according to a first quality level;
generating an encoded second image by encoding the second image according to a second quality level that is lower than the first quality level; and
combining the encoded first image and the encoded second image into an image file; and
perform decoding with quality improvement comprising:
receiving said encoded first image and said encoded second image;
decoding the encoded first image and a portion of the encoded second image;
identifying portions of the decoded first image that correspond to the decoded portion of the second image;
selecting a portion of said portions of the decoded first image based on the decoded portion of the second image; and
improving the decoded portion of the second image based upon the selected portion of the decoded first image so that the improved decoded portion of the second image has a higher quality level than the second quality level.

20. The system of claim 19 wherein said receiving includes extracting the first and second encoded images from the image file.

21. The system of claim 19 wherein the first image is of a scene and the second image is of a portion of the scene.

22. The system of claim 19 wherein the first image is of a first view and the second image is of a second view that intersects the first view.

23. The system of claim 19 wherein the first image is encoded according to a first JPEG algorithm and the second image is encoded according to a second JPEG algorithm.

24. The system of claim 19 wherein the corresponding portions of the decoded first image are in a same relative image position as the decoded portion of the second image.

25. The system of claim 19 wherein said selecting is based upon a similarity function.

* * * * *